(12) United States Patent
Fanning et al.

(10) Patent No.: US 11,834,029 B2
(45) Date of Patent: Dec. 5, 2023

(54) MATERIAL PROCESSING APPARATUS WITH HYBRID POWER SYSTEM

(71) Applicant: Terex GB Limited, Dungannon (GB)

(72) Inventors: Ciaran Fanning, Belfast (GB); Barry McMenamin, Castlederg (GB)

(*) Notice: Subject to any disclaimer, the term of this patent is extended or adjusted under 35 U.S.C. 154(b) by 362 days.

(21) Appl. No.: 17/177,922

(22) Filed: Feb. 17, 2021

(65) Prior Publication Data

US 2021/0277629 A1    Sep. 9, 2021

(30) Foreign Application Priority Data

Feb. 20, 2020  (GB) .................................... 2002399

(51) Int. Cl.
| | | |
|---|---|---|
| *B60W 10/30* | (2006.01) | |
| *B60W 20/13* | (2016.01) | |
| *B60W 10/08* | (2006.01) | |
| *E02F 7/06* | (2006.01) | |
| *E02F 9/20* | (2006.01) | |
| *H02J 7/14* | (2006.01) | |
| *B60K 1/00* | (2006.01) | |
| *E02F 9/22* | (2006.01) | |

(52) U.S. Cl.
CPC ............... *B60W 10/30* (2013.01); *B60K 1/00* (2013.01); *B60W 10/08* (2013.01); *B60W 20/13* (2016.01); *E02F 7/06* (2013.01); *E02F 9/2075* (2013.01); *E02F 9/2217* (2013.01); *H02J 7/14* (2013.01); *H02J 7/1438* (2013.01); *B60W 2300/17* (2013.01)

(58) Field of Classification Search
None
See application file for complete search history.

(56) References Cited

U.S. PATENT DOCUMENTS

| | | | | |
|---|---|---|---|---|
| 4,489,242 A | * | 12/1984 | Worst ........................ | B60L 1/00 |
| | | | | 123/41.46 |
| 7,503,134 B2 | * | 3/2009 | Buckner ................. | E03F 9/002 |
| | | | | 15/352 |
| 7,525,206 B2 | * | 4/2009 | Kagoshima ........... | B60W 10/26 |
| | | | | 180/65.265 |
| 7,604,183 B1 | * | 10/2009 | Hensley ............... | A01C 23/007 |
| | | | | 180/53.4 |

(Continued)

FOREIGN PATENT DOCUMENTS

| | | | | |
|---|---|---|---|---|
| CN | 108282999 B | * | 6/2021 | ........... B60K 28/165 |
| CN | 114787452 A | * | 7/2022 | .............. E02F 3/437 |

(Continued)

OTHER PUBLICATIONS

UKIPO Search and Written Opinion, completed Oct. 21, 2020, for GB2002399.0.

*Primary Examiner* — Kevin R Steckbauer
(74) *Attorney, Agent, or Firm* — Warner Norcross + Judd LLP

(57) ABSTRACT

A material processing apparatus has as a power supply system comprising an electrical power supply and a hydraulic power supply. The electrical power supply comprises a battery pack and an electrical generator. The power supply system is operable in different power supply modes in which said at least one battery and/or said electrical generator supply electrical power to the electrically powered components of the system.

18 Claims, 7 Drawing Sheets

(56) References Cited

U.S. PATENT DOCUMENTS

| | | | | |
|---|---|---|---|---|
| 8,175,780 B2* | 5/2012 | Quinn | E02F 9/2246 | 318/432 |
| 8,285,434 B2* | 10/2012 | Yanagisawa | B60W 20/10 | 701/22 |
| 8,948,944 B2* | 2/2015 | Kawashima | E02F 9/22 | 701/50 |
| 9,010,467 B2* | 4/2015 | Burnier | B60K 25/06 | 180/53.4 |
| 9,013,050 B2* | 4/2015 | Yamashita | B60K 6/485 | 60/431 |
| 9,067,501 B2* | 6/2015 | Anders | B60L 50/30 | |
| 9,598,838 B2* | 3/2017 | Kaneko | B60L 50/15 | |
| 9,764,634 B2* | 9/2017 | Dorsett | E02F 9/2041 | |
| 9,873,318 B2* | 1/2018 | Dorsett | F16D 61/00 | |
| 10,377,225 B2* | 8/2019 | Dorsett | F16D 61/00 | |
| 10,449,849 B2* | 10/2019 | Dorsett | B60T 1/02 | |
| 10,458,095 B2* | 10/2019 | Caillieret | E02F 3/43 | |
| 10,851,521 B2* | 12/2020 | Aizawa | E02F 9/2235 | |
| 11,084,367 B2* | 8/2021 | Dorsett | B60T 1/10 | |
| 2006/0116797 A1* | 6/2006 | Moran | B60L 58/20 | 180/65.245 |
| 2007/0214782 A1* | 9/2007 | Komiyama | B60W 20/10 | 60/431 |
| 2010/0161186 A1* | 6/2010 | Quinn | B60W 10/30 | 701/54 |
| 2010/0280697 A1* | 11/2010 | Yanagisawa | E02F 9/2217 | 180/65.21 |
| 2016/0138245 A1* | 5/2016 | Moki | B60K 6/12 | 903/906 |
| 2020/0048871 A1* | 2/2020 | Nishizawa | E02F 9/265 | |
| 2021/0277629 A1* | 9/2021 | Fanning | E02F 7/06 | |

FOREIGN PATENT DOCUMENTS

| | | | | |
|---|---|---|---|---|
| CN | 115126017 A | * | 9/2022 | |
| EP | 2228492 A1 | * | 9/2010 | ............ B60W 10/08 |
| EP | 2228492 A1 | | 9/2010 | |
| EP | 2228492 A4 | * | 2/2017 | ............ G60W 10/08 |
| WO | WO-2010075141 A2 | * | 7/2010 | ............ B60W 10/06 |
| WO | WO-2022197835 A1 | * | 9/2022 | ............ E02F 9/2203 |

* cited by examiner

MATERIAL PROCESSING APPARATUS WITH HYBRID POWER SYSTEM

FIELD OF THE INVENTION

The present invention relates to machines with hybrid power systems. The invention relates particularly but not exclusively to material processing apparatus.

BACKGROUND TO THE INVENTION

Machines such as material processing apparatus conventionally include a diesel engine, an electrical system and a hydraulic system. The diesel engine may provide mechanical power to a main processing unit, for example a screening apparatus, of the apparatus, and also to the wheels or tracks in cases where the apparatus is mobile. The diesel engine may power the electrical system via an alternator, and may also power the hydraulic system via a hydraulic pump and hydraulic motor.

For environmental reasons, it is desirable to reduce the use of internal combustion engines, and in particular diesel engines. However, because of the typical power requirements of some material processing apparatus, replacing the diesel engine with electrical motors, or using a conventional diesel-electric hybrid system, can be cost prohibitive and/or impractical. It is also desirable to limit the use of hydraulic systems to reduce the possibility of oil spillage.

It would be desirable to mitigate the problems outlined above.

SUMMARY OF THE INVENTION

One aspect of the invention provides a power supply system comprising: an electrical system comprising an electrical power supply configured to supply electrical power to at least one electrically powered component; a hydraulic system comprising a hydraulic power supply configured to supply hydraulic power at least one hydraulically powered component; at least one controller for controlling the operation of said power supply system; wherein said electrical power supply comprises at least one battery and an electrical generator; and wherein said at least one controller is configured to operate said power supply system in any one of at least two power supply modes in which said at least one battery and/or said electrical generator supply electrical power to said at least one electrically powered component.

In typical embodiments, said at least one electrically powered component comprises one or more electric motor. Typically, said at least one hydraulically powered component comprises one or more hydraulic motor, and/or one or more hydraulic actuator.

In preferred embodiments the system includes an internal combustion engine mechanically coupled to said electrical generator in order to drive said electrical generator.

Preferably, said electrical generator is a motor-generator, and said hydraulic power supply comprises a mechanically powered pump, wherein said motor-generator is mechanically coupled to said pump to enable transmission of mechanical power from said motor-generator to said pump. Said at least one controller may be configured to operate said power supply system in at least one mode in which said motor-generator operates as a motor and in which mechanical power is transmitted from said motor-generator to said mechanically powered pump, and wherein said motor-generator preferably receives electrical power from said electrical system, preferably from said at least one battery or from an external electrical power supply.

Said at least one controller may be configured to operate said power supply system in at least one mode in which mechanical power produced by said internal combustion engine is transmitted to said pump via said motor-generator. Said motor-generator may be configured to operate as a generator and to supply electrical power to said electrical system. Said motor-generator may be configured to operate as a motor and receives electrical power from said electrical system, preferably from said at least one battery or from an external electrical power supply.

Said hydraulic power supply typically comprises an electrically powered pump, and wherein power supply system is configured to supply electrical power to said pump from said at least one battery and/or from said electrical generator.

In some embodiments, said power supply system is operable in at least one mode in which said at least one battery, preferably only said at least one battery, supplies electrical power to said at least one electrically powered component, and wherein said at least one battery, preferably only said at least one battery, also supplies electrical power to operate said hydraulic system. Said at least one battery may supply electrical power to operate said motor-generator as a motor, said motor-generator providing mechanical power to the hydraulic pump. Said at least one battery may supply electrical power to said electrically powered pump.

In some embodiments, said at least one controller causes said power supply system to supply said electrical power from said generator, as well as or instead of said from said at least one battery, preferably depending on the level of electrical power available from said at least one battery, and/or on the level of load requiring electrical power.

Optionally, said power supply system is operable in at least one mode in which said generator, optionally only said generator, supplies electrical power to said at least one electrically powered component. Optionally, said generator supplies electrical power to said electrically powered pump.

In some embodiments the system is configured to transmit mechanical power to said pump from said engine.

Optionally, said at least one controller causes said power supply system to supply said electrical power from said at least one battery, as well as from said generator, preferably depending on the level of load requiring electrical power.

Optionally said motor-generator is configured to produce mechanical power supplementing the mechanical power produced by the engine and transmitted to the pump.

Optionally said at least one controller is configured to cause said motor-generator to operate as a motor depending on the power required by the hydraulic system.

Optionally said motor-generator is mechanically coupled to said pump by a clutch that is operable to selectively transmit or not transmit mechanical power to said pump.

Optionally in said at least one mode the internal combustion engine is switched off.

Optionally, the system includes an electrical inlet for receiving electrical power from an external power supply and wherein said power supply system is operable in at least one mode in which electrical power is supplied to said at least one electrically powered component from said external power supply, optionally only from said external power supply.

Optionally, said internal combustion engine is off in said at least one mode.

Optionally, in at least one mode of operation said motor-generator is disengaged from said pump by said clutch.

From another aspect the invention provides a material processing apparatus comprising a power supply system according to the first aspect of the invention. Typically, said at least one electrically powered component comprises any one or more of: a screen drive; a feeder drive; one or more conveyor drives, wherein the or each drive may comprise one or more electric motor; and/or wherein said at least one hydraulically powered component comprises any one or more of an articulation system comprising at least one hydraulic actuator; and/or wheel or track drive means comprising one or more hydraulic motor.

The material processing apparatus may comprise at least one material processing unit that is operable in a working state only by one or more of said electrically powered components, and wherein, preferably, in said working state said hydraulic system is turned off.

Optionally, in said working state, said internal combustion engine is turned off.

Optionally, said at least one material processing apparatus comprises a screening apparatus.

Other advantageous aspects and features of the invention will become apparent to those ordinarily skilled in the art upon review of the following description of a specific embodiment and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 1:
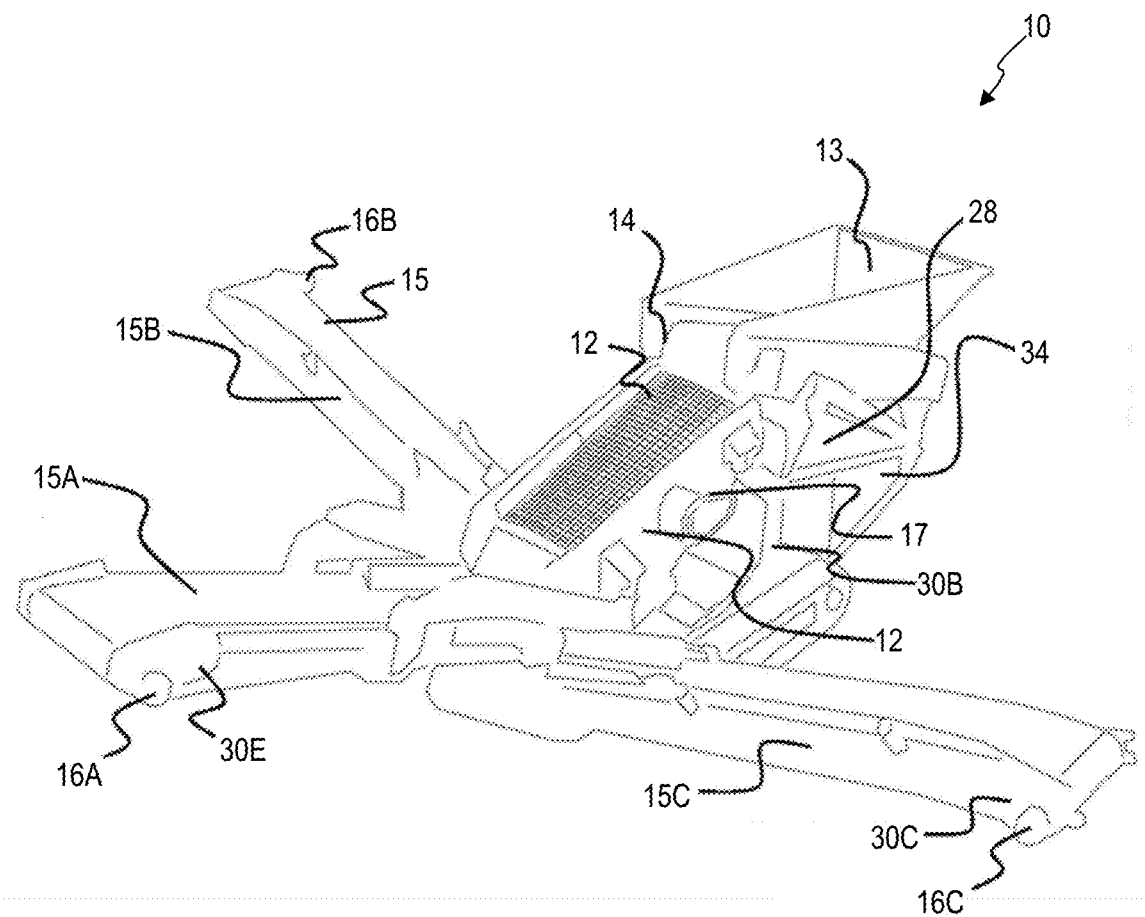
FIG. 1 is a perspective outline view of a material processing apparatus embodying one aspect of the invention and which includes a power system embodying another aspect of the invention.

Referring now to drawings there is shown, generally indicated as 10, a stylised perspective view of a material processing apparatus embodying one aspect of the invention. Depending on the embodiment, the apparatus 10 may be configured to perform any one or more of a plurality of processes, such as feeding, conveying, screening, separating, crushing, breaking, recycling, shredding, demolition and/or washing, on one or more types of aggregate or other material, for example rocks, stones, gravel, sand and/or soil, or any other material, especially but not exclusively, material that is quarried, mined, excavated or requires breaking, recycling or sorting. To this end, the apparatus 10 typically includes one or more material processing unit 12 configured to perform one or more of the foregoing processes. In the illustrated embodiment, the material processing unit 12 is a screening apparatus, usually referred to as a screen. It will be understood that the invention is not limited to use with screens and may be employed with other types of material processing unit, e.g. a crusher, a separator, a shredder, a washer, a conveyor or a breaker. Moreover, the invention is not limited to use with material processing apparatus and may be used with other machines, especially those with a hydraulic power system. Examples of other such machines include construction, mining, excavating, lifting, drilling and loading machines, e.g. an excavator or crane.

The apparatus 10 comprises a chassis 11 that carries the (or each) material processing unit 12. The chassis 11 may also carry one or more other components that facilitate use of the processing unit 12, usually including a feeder unit 13 driven by a feeder drive 14 for delivering material to the material processing unit 12. The feeder unit 13 may take any conventional form, typically comprising a hopper and optionally a feed conveyor and/or a screen (not shown). The apparatus 10 typically includes at least one conveyor 15 for receiving material processed by the processing unit 12 and outputting the received material from the apparatus 10, e.g. to a stockpile, or to another machine or apparatus. Such conveyors 15 are sometimes referred to as outfeed conveyors. In the illustrated embodiment, the apparatus 10 includes a front conveyor 15A and first and second side conveyors 15B, 15C. Typically, the conveyors 15 receive material of different grades. For example, the front conveyor 15A may receive oversize material, the first side conveyor 15B may receive mid-grade material, and the second side conveyor 15C may receive fine grade material. The conveyors 15 may receive material directly from the processing unit 12, or indirectly via one or more other conveyor (not shown) depending on the embodiment. Alternative embodiments may have more or fewer conveyors. A respective conveyor drive 16A, 16B, 16C is provided for each conveyor 15.

In preferred embodiments, a screen drive 17 is provided for driving the screen 12. In alternative embodiments, one or more drives may be provided for driving the, or each, material processing unit 12, the number and nature of the drive(s) depending on the type of material processing unit.

More generally, the apparatus 10 typically includes multiple drives, at least a respective one for driving respective powered components of the apparatus 10 such as conveyor(s), feeder(s) and material processing unit(s). Each drive 14, 16A, 16B, 16C, 17 is configured to drive the respective powered component in conventional manner. For example, the feeder drive 14 may be configured to vibrate the feeder 13, the conveyor drives 16A, 16B, 16C may be configured to run a respective conveyor belt, and the screen drive 17 may be configured to vibrate the screen 12.

Each drive 14, 16A, 16B, 16C, 17 typically comprises at least one motor (e.g. rotary or linear as applicable) and/or at least one actuator. The motor(s) and/or actuator(s) may be coupled to one or more other drive components (e.g. roller(s), gear(s), belt(s) and/or shaft(s)) as required to effect the operation of the drive, all of which may be conventional and is not described further herein. Each motor is typically an electric motor (AC or DC as is convenient) or a hydraulic motor. Similarly, any actuator(s) may be electrically or hydraulically powered as appropriate. In the illustrated embodiment, each of the drives 14, 16A, 16B, 16C, 17 comprises an electric motor, in particular an AC motor. In alternative embodiments any one or more of the drives 14, 16A, 16B, 16C, 17 may comprise a hydraulic motor. Alternatively still, the material processing unit 12 may be driven by an internal combustion engine (e.g. in embodiments where it comprises a crusher).

In typical embodiments, the apparatus 10 is mobile and comprises one or more wheels and/or tracks 18 mounted on the chassis 11 for conveying the apparatus on a ground surface. The apparatus 10 includes drive means for driving the wheels and/or tracks 18. The drive means typically comprises one or more motor (not shown) for each wheel or track 18, the motor(s) typically being an electric motor (typically AC) or a hydraulic motor depending on the embodiment. In alternative embodiments, the apparatus 10 may be semi-mobile, for example comprising fixed or adjustable legs (and usually no wheels or tracks).

FIGS. 2 to 7 are block diagrams of a respective embodiment of the material processing apparatus showing only those components of the apparatus that are helpful for understanding the invention. Each of FIGS. 2 to 9 shows a power system and at least some of the components of the apparatus 10 that are powered by the power system. Each power system comprises an electrical system comprising an electrical power supply configured to supply electrical power to one or more electrical loads (typically including at least one electric motor and/or other electrically powered component(s)), and a hydraulic power supply system comprising a hydraulic power supply configured to supply hydraulic power to one or more hydraulic loads (typically including a hydraulic actuation system and/or one or more other hydraulically powered components). In FIGS. 2 to 7 the respective power systems are configured differently but like numerals are used to denote like parts and the same or similar description applies as would be apparent to a skilled person.

Figure 2:
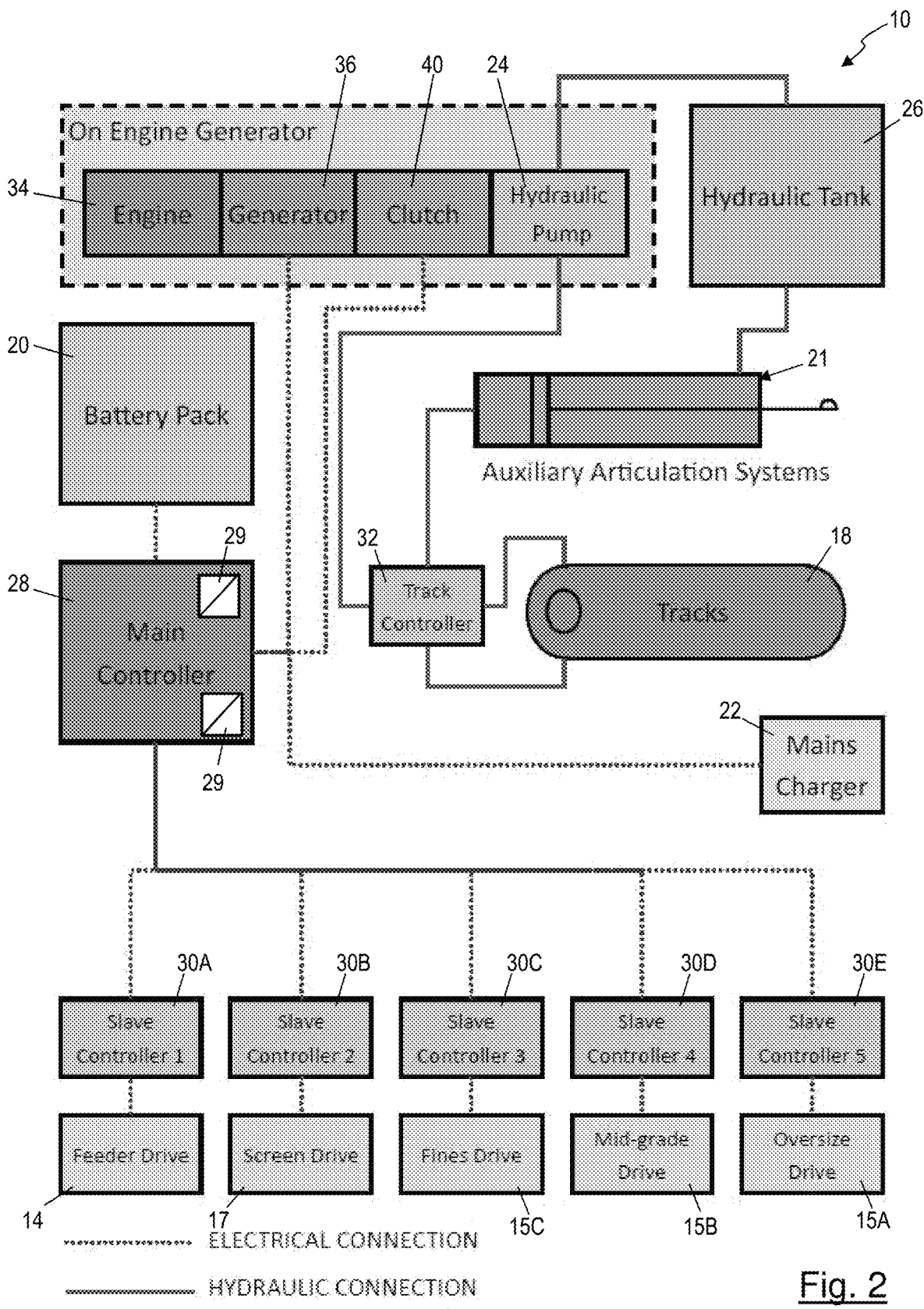
FIG. 2 is a block diagram of a first power system embodying the invention, the power system being shown with powered components of the material processing apparatus of FIG. 1.

Referring now in particular to FIG. 2, there is shown an embodiment of the material processing apparatus 10 having a first power system configuration. The power system includes an electrical power supply comprising at least one battery 20, or battery pack, and, optionally, an electrical power inlet 22 for connecting the power system to an external electrical power supply, for example a mains power supply, or an external generator (not shown) or other AC power supply. The power system includes a hydraulic power supply comprising a hydraulic pump 24 connected to a hydraulic fluid reservoir 26. The power system further includes a main controller 28 configured to control the operation of the power system as is described in more detail hereinafter.

The electrical power supply is configured to supply electrical power to electrical loads which typically comprise at least one electrically powered drive and/or actuator. In the illustrated embodiment, the electrical loads are the drives 14, 16A, 16B, 16C, 17, each of which is assumed to comprise an AC electrical motor. Alternatively, any one or more of the drives 14, 16A, 16B, 16C, 17 may comprise a DC electrical motor. Other electrical loads may be present depending on the configuration of the apparatus. In general, the electrical loads may require either AC power or DC power, and may comprise an AC motor or DC motor as applicable. In preferred embodiments, electrical power is supplied to the electrical loads via the main controller 28. The main controller 28 typically comprises one or more power converters 29, e.g. DC-AC inverter(s), AC-DC rectifier(s), DC-DC converter(s) and/or AC-AC converter(s) as applicable, for supplying electrical power to the electrical loads and/or for charging the battery pack 20. The, or each, converter may be configured to perform any one or more of AC-DC conversion, DC-AC conversion, frequency conversion or voltage level conversion, as required, and may be conventional in configuration. For example, to enable the main controller 28 to provide AC electrical power to AC electrical loads, or to the generator 36, from the battery bank 20, the main controller 28 may comprise one or more DC-AC power converter. In preferred embodiments, the main controller 28 distributes DC electrical power to at least some of the electrical loads for reasons of safety, and may comprise one or more DC-DC converter. Optionally, to enable the main controller 28 to supply electrical power to the loads from an external electrical power supply received at inlet 22, the controller 28 may comprise one or more power converter for converting the frequency and/or voltage of the external power supply as required, e.g. one or more AC-AC converter and/or one or more AC-DC converter. Optionally, to enable the main controller 28 to supply electrical power to the loads from motor-generator 36, the controller 28 may comprise a power converter for converting the frequency and/or voltage of the generator supply as required, e.g. one or more AC-AC converter and/or one or more AC-DC converter. Optionally, the main controller 28 may comprise one or more power converter for charging the battery pack 20 with electrical power received from the motor-generator 36 and/or the external power supply, e.g. one or more AC-DC converter.

In preferred embodiments, a respective drive controller, or slave controller, 30A, 30B, 30C, 30D, 30E controls the operation of each drive 14, 16A, 16B, 16C, 17. Each slave controller 30A, 30B, 30C, 30D, 30E is connected to the main controller 28 to receive electrical power, and optionally control signals, therefrom. Each slave controller 30A, 30B, 30C, 30D, 30E may comprise a power converter for converting the type (AC-DC or DC-AC), frequency and/or voltage of the received power as required for the respective electrical load. Optionally, any one or more of the slave controllers may comprise a variable frequency drive. For example, in preferred embodiments, the drives 14, 16A, 16B, 16C, 17 operate using AC power and the main controller 28 supplies the controllers 30A, 30B, 30C, 30D, 30E with DC power, and so the controllers comprise a suitable DC-AC converter.

In typical embodiments, the controllers 30A, 30B, 30C, 30D, 30E are configured to control the operation of the respective drive 14, 16A, 16B, 16C, 17 in accordance with one or more control signal provided by the main controller 28. The drive controllers may control at least some aspects of the operation of the respective drive autonomously. For example, the drive controller may monitor one or more operating parameters of the respective drive, e.g. temperature, and control its operation accordingly. Each drive controller may operate the respective drive in order to meet one or more operating set points provided to it by the main controller 28, e.g. in relation to torque and/or speed. Each drive controller may monitor the load on the respective drive and, if required, demand more power from the main controller 28.

The main controller 28 and the drive controllers 30A, 30B, 30C, 30D, 30E may comprise one or more suitably programmed processor (e.g. a microcontroller, microprocessor or PLC) to control its operation and otherwise as may be necessary and as would be apparent to a skilled person.

In preferred embodiments, the battery pack 20 comprises at least one rechargeable battery, and is conveniently rechargeable by an external power supply via the electrical power inlet 22. Preferably, recharging is performed by the main controller 28 which is configured to receive electrical power from the inlet 22 and/or from the motor-generator 36 and to use same to charge the battery pack 20. The main controller 28 may include any suitable conventional charging circuitry (e.g. comprising suitable power converter(s)) for this purpose.

The hydraulic power supply is configured to supply hydraulic power to hydraulic loads which typically comprise hydraulically powered drive(s), motor(s) and/or actuator(s). In typical embodiments, the hydraulic load comprises one or more hydraulic articulation system 21 comprising one or more hydraulic actuators (not shown individually), e.g. hydraulic ram(s). The hydraulic articulation system(s) 21 may be configured to actuate one or more components of the apparatus 10 as required, for example folding or moving conveyor(s) 15, and/or adjusting the position of the feeder 13 or processing unit 12, and may comprise any suitable arrangement of hydraulic actuator(s) for such purposes. The hydraulic articulation system(s) 21 may be conventional and is not described in detail herein.

In embodiments where the tracks/wheels 18 are hydraulically powered, the hydraulic load comprises the or each hydraulic drive, which typically comprises a hydraulic motor, for driving the tracks/wheels 18. In FIG. 2 it is assumed that the apparatus 10 has hydraulically powered tracks 18. The tracks 18 are operated by a track controller 32. The track controller 32 may take any suitable conventional form. Typically, for hydraulically powered tracks 18, the track controller 32 comprises means (e.g. one or more valves) for operating one or more hydraulic motor(s) (not shown) coupled to the tracks 18.

In use, hydraulic fluid is supplied to the hydraulic loads 21, 18, 32 from the reservoir 26 under the action of the hydraulic pump 24 via any suitable configuration of hydraulic circuitry. In the illustrated example, the hydraulic reservoir 26 serves as a source and a sink for the hydraulic fluid, but in alternative embodiments separate source and sink hydraulic reservoirs may be provided.

In preferred embodiments, the apparatus 10 includes an internal combustion engine 34, typically a diesel engine. The engine 34 may be mounted on the chassis in any conventional manner. The engine 30 has a rotatable output shaft (not shown) for providing mechanical output power.

A motor-generator 36 is mechanically coupled to the engine 34. In this context the term "motor-generator" is intended to mean a power transducer that can operate either as an electric motor or an electrical generator, i.e. converting electrical power into mechanical power, or vice versa. The motor-generator 36 is mechanically coupled to the output shaft of the engine 34 so that, when acting as a generator, the motor-generator 36 converts mechanical power produced by the engine 34 into electrical power. Typically, the motor-generator 36 produces AC electrical power, preferably 3 phase AC electrical power, in this mode of operation and may therefore be said to comprise an alternator.

The motor-generator 36 has a rotor (not shown) that is rotated by the engine 34 when the motor-generator 36 is acting as a generator. In some embodiments, the output shaft of the engine 34 provides the rotor, i.e. a portion of the output shaft of the engine 34 extends into the motor-generator 36 and carries suitable magnets/windings. The engine 34 may be permanently mechanically coupled to the motor-generator 34. Alternatively, the rotor is mechanically coupled to the output shaft of the engine 34, for example by a gear system (not shown) and/or a clutch, e.g. a freewheel clutch (not shown).

In the embodiment of FIG. 2, the hydraulic pump 24 is a mechanically powered pump. Advantageously, the motor-generator 36 is mechanically coupled to the hydraulic pump 24 in order to selectively provide mechanical power to the pump 24. The mechanical coupling between the motor-generator 36 and the pump 24 typically comprises a clutch 40, and may also comprise a gear system (not shown). Preferably, the mechanical coupling is such that, when the motor-generator 36 is operating as a motor or as a generator, the rotor of the motor-generator 36 can be mechanically coupled to the pump 24 (depending on whether or not the clutch 40 is engaged) in order to transmit mechanical power to the pump 24.

In preferred embodiments, the engine 34 is mechanically coupled to the hydraulic pump 24 in order to selectively provide mechanical power to the pump 24. Conveniently, the mechanical coupling between the engine 34 and the pump 24 comprises the mechanical coupling between the between the motor-generator 36 and the pump 24, and any coupling components (e.g. gear system and/or clutch) that may be present between the engine 34 and the motor-generator 36. In this arrangement, rotation of the engine output shaft is transmitted to the pump 24 via the rotor of the motor-generator 36 when the clutch 40 is engaged. It is noted that the engine 34 is able to provide mechanical power to the pump 24 when the motor-generator 36 is operating as a motor or as a generator.

In preferred embodiments, the engine 34, motor-generator 36, clutch 40 and hydraulic pump 24 are provided together as a unit.

In preferred embodiment, the motor-generator 36 is electrically connected to the main controller 28 so that it may deliver electrical power to the main controller 28 when acting as a generator, and receive electrical power from the main controller 28 when acting as a motor. To this end, the main controller 28 may comprise one or more suitable power converters, for example for converting the frequency and/or voltage of the power received from the motor-generator 36 or delivered to the motor-generator 36, as required.

The main controller 28 is electrically connected to the clutch 40 in order to operate the clutch 40 as is described in more detail hereinafter.

It will be apparent from the foregoing that the engine 34 and motor-generator 36 form part of the power system of the apparatus 10. In particular, the power system can be configured such that the engine 34 provides mechanical power to the hydraulic pump 24 and so serves as part of the hydraulic power supply, and/or such that the engine 34 drives the motor-generator 36 in generator mode and so serves as part of the electrical supply system. The power system can be configured such that the motor-generator 36 serves as part of the electrical power supply when operating in generator mode, or such that the motor-generator 36 serves as part of the hydraulic power supply when operating in motor mode.

More generally, the power system comprises one or more power converters for converting electrical power in the system. As described above, the power conversion may involve any one or more of frequency conversion, voltage level conversion and AC-DC or DC-AC conversion, as required. In the illustrated embodiments, at least some of the power converters are provided in the main controller 28 and/or in the drive controllers. In alternative embodiments, the power converters may be provided separately from the main controller or drive controllers as is convenient.

The power system of FIG. 2 is a hybrid power system that supports multiple power supply modes for the apparatus 10. In at least one mode, the engine 34 provides mechanical power to the hydraulic pump 24. To this end the clutch 40 is engaged and the rotation of the output shaft of the engine 34 is transmitted to the pump 24 via the rotor of the motor-generator 36 and the clutch 40. The clutch 40 is operated into its engaged state by the main controller 28. Optionally, the motor-generator 36 operates in its generator mode to supply electrical power to the power system, which electrical power may be used to provide power to one or more electrical loads, and/or to charge the battery pack 20, as required. In the illustrated embodiment the electrical power produced by the motor-generator 36 is provided to the main controller 28, which may be configured to use it to supply the slave controllers, or charge the battery pack 20 as required. The electrical loads of the apparatus 10 may be provided with electrical power from any one or more of the battery pack 20, the external power supply via power inlet 22, and/or the motor-generator 36. In preferred embodiments, the supply of electrical power to the electrical loads is controlled by the main controller 28. For example, if the power inlet is connected to an external power supply, the main controller 28 may be configured to cause the power system to supply the electrical loads from the external power supply only. Advantageously, this arrangement allows the main controller 28 to use electrical power from the motor-generator 36 to charge the battery back, if required. Alternatively, the electrical power from the motor-generator 36 may be used to supplement the power received from the external power supply. Alternatively, the electrical power from the motor-generator 36 and/or from the battery pack 20 may be used to supply the electrical loads, particularly if the inlet 22 is not connected to an external power supply.

Advantageously, the motor-generator 36 may be operated in its motor mode in order to supply mechanical power to the hydraulic pump 24 via the clutch 40. The configuration may be such that both the motor-generator 36 and the engine 34 simultaneously act to provide mechanical power to the pump 24. In particular, the engine 34 and the motor-generator 36 each acts to rotate the rotor of the rotor-generator 36, and their combined mechanical power is transmitted to the pump 24 via the clutch 40. The motor-generator 36 and the engine 34 are configured to rotate the rotor in the same rotational direction. Optionally a freewheel clutch may be provided between the motor-generator 36 and the engine 34 to prevent mechanical power being transmitted from the motor-generator 36 to the engine 34. The power system is configured to provide the motor-generator 36 with electrical power from the battery pack 20 to enable it to operate in motor mode. In preferred embodiments this is effected by the main controller 28. Alternatively, the power system may be configured to provide the motor-generator 36 with electrical power from an external power supply via the electrical power inlet 22.

In at least one other mode, the engine 34 is turned off, and/or is decoupled from the motor-generator 36, such that it does not provide mechanical power to the motor-generator 36 or to the pump 24. The motor-generator 36 is configured to operate in its motor mode to supply mechanical power to the hydraulic pump 24 via the clutch 40. The power system is configured to provide the motor-generator 36 with electrical power from the battery pack 20 to enable it to operate in motor mode. In preferred embodiments this is effected by the main controller 28. Alternatively, the power system may be configured to provide the motor-generator 36 with electrical power from an external power supply via the electrical power inlet 22. The electrical loads of the apparatus 10 may also be provided with electrical power from the battery pack 20, or from the external power supply via power inlet 22.

In some modes of use, for example when the apparatus 10 is stationary and no articulation of conveyors or other components is required, there is no need for hydraulic power. In such modes, the engine 34 may be turned off. The electrical loads may be supplied with electrical power from the battery pack 20. Alternatively, or in addition, the electrical loads may be supplied with electrical power from an external power supply via the electrical power inlet 22. The motor-generator 36 may be disabled so that it does not provide mechanical power to the pump 24. Advantageously, when disabled, the motor-generator 36 does not draw electrical power from the battery pack 20. Alternatively, the configuration may be such that the engine 34 drives the motor-generator 36 in generator mode, and the clutch 40 may be disengaged so that mechanical power is not transmitted to the pump 24. The power system may be configured to use the electrical power generated by the motor-generator 36 to power the electrical load(s) and/or to charge the battery pack 20, as required.

Advantageously, the power system is configurable so that, in at least one mode of operation, the electrical load(s) and/or the hydraulic load(s) of the apparatus 10 are powered solely by the battery pack 20. More particularly, as described above, the battery pack 20 may be used to power the motor-generator 36 in motor mode, which in turn provides mechanical power to the hydraulic pump 24. Advantageously, the engine 34 may be turned off. During periods in which there is a relatively high power demand and/or when the battery pack 20 has a relatively low charge, the engine 34 is started to assist in supplying power to the electrical load(s) and/or to the hydraulic load(s). This may be achieved by using the engine 34 to power the hydraulic pump 24 and/or to drive the motor-generator 36 in generator mode, as described above. If the battery pack 20 fails, then the electrical supply may be provided by the motor-generator 36 in generator mode powered by the engine 34. The preferred power system is advantageous in that it allows the apparatus 10 to use an engine 34 with a relatively small capacity (and which produces relatively low emissions) and/or to limit the use of the engine 34 in order to reduce emissions.

Alternatively, the power system is configurable so that, in at least one mode of operation, the engine 34 powers the hydraulic pump 24 and drives the motor-generator 36 in generator mode, as described above. The electrical power produced by the motor-generator 36 is used to supply the electrical load(s). Electrical power from the battery pack 20 may be used to supplement the electrical power provided by the motor-generator 36 if required. Optionally, the motor-generator 36 may be operated as a motor, with electrical power from the battery pack being supplied to the motor-generator 36 for this purpose. Advantageously, to support this configuration, the apparatus 10 may use not only a relatively small capacity engine 34, but also a relatively small capacity battery pack 20 in comparison to embodiments in which the power system supports battery-only power supply.

It is noted that depending on how the apparatus 10 is being used, its electrical and hydraulic power requirements can vary significantly and in preferred embodiments the configuration of the power system can adapt to suit the power requirements at any given time. For example, in some modes of use (for example when the apparatus 10 is moving using the wheels/tracks 18, and/or during set up, e.g. when the conveyors are being folded or unfolded) the hydraulic power requirements may be relatively high in which case electrical power from the battery pack 20 may be used to power the motor-generator 36 in motor mode to provide or supplement mechanical power to the pump 24. In other modes of use (for example when the apparatus 10 is stationary and the conveyors are deployed, e.g. when the apparatus 10 is in a working state) the electrical power requirements may be relatively high and the hydraulic power requirements relatively low (or zero) in which case power from the battery pack 20 is used to supply the electrical load(s) (and the engine 34 may be turned off), and/or the engine 34 may drive the motor-generator 36 in generator mode with the generated electrical power being used to power the electrical load(s). As described above, in preferred embodiments, the main controller 28 receives electrical power from the battery pack 20 and/or motor-generator 36 and/or an external electrical power supply via inlet 22, as applicable, and uses the received electrical power to supply electrical power to the electrical load(s).

In preferred embodiments, the powered component(s) (preferably all of them) of the apparatus 10 that are required to operate the apparatus 10 in its working state, e.g. when it is screening in the illustrated embodiment, are electrically powered. Accordingly, hydraulic power is not required and the hydraulic power system, in particular the hydraulic pump 24, can be disabled or otherwise turned off. Disabling the pump 24 may involve disengaging the clutch 40 so that mechanical power is not delivered to the pump 24. In the working state, the engine 34 may be turned off. Electrical power may be provided to the relevant electrically powered components by the battery pack 20 and/or the external power supply via inlet 22, as applicable. Alternatively, the engine 34 may be running and used to operate the motor-generator 36 in generator mode in order to provide electrical power to the electrical power system (as well as or instead of electrical power by the battery pack 20 and/or the external power supply via inlet 22). It is advantageous to disable the hydraulic power system during the working state not only because it reduces the overall power requirements of the apparatus 10 when working, but also because it reduces the likelihood of an oil spillage during use. It is also advantageous to turn the engine off during the working state to reduce emissions and fuel consumption.

In typical embodiments, the powered component(s) of the apparatus 10 that are required to operate the apparatus 10 in its working state comprise the primary material processing unit(s) 12 and, typically, one or more ancillary component(s) such as one or more conveyor and/or one or more feeder. Accordingly, it is preferred that all of the drive(s) and/or motor(s) that are required to operate the primary material processing unit(s) 12 and any ancillary components in the working state are electrically powered.

Powered component(s) of the apparatus 10 that are required when the apparatus 10 is not its working state (and preferably not required when the apparatus 10 is in its working state) may be hydraulically powered. Typically, such powered components are those that are required during set-up of the apparatus 10, and/or during transport or tracking of the apparatus 10, for example components (e.g. actuator(s), motor(s) and/or drive(s)) required to deploy, fold or otherwise position conveyor(s) or feeder(s) into or out of the working state, and/or components required to transport the apparatus 10 to a desired working location, i.e. for powering the wheels or tracks 18. In the illustrated embodiment, the articulation system(s) 21 and tracking controller 32 are hydraulically powered.

Figure 3:
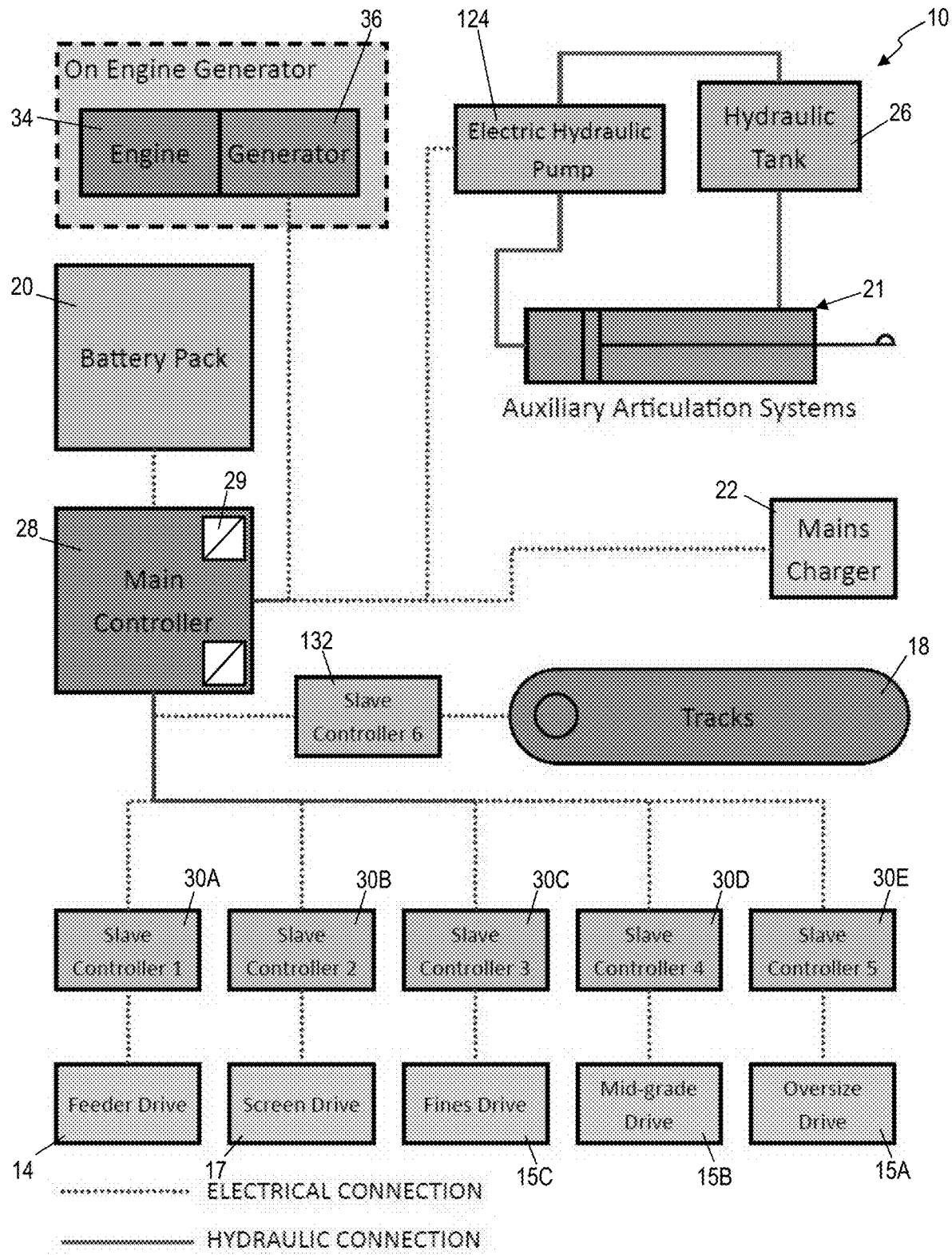
FIG. 3 is a block diagram of a second power system embodying the invention, the power system being shown with powered components of the material processing apparatus of FIG. 1.

Referring now to FIG. 3, there is shown an embodiment of the material processing apparatus 10 having an alternative power system configuration. The apparatus 10 and power system shown in FIG. 3 are similar to those of FIG. 2, with like numerals denoting like parts and the same description applying as would be apparent to a skilled person. In the embodiment of FIG. 3, the hydraulic pump 124 is electrically powered. The power system is configured to supply electrical power to the pump 124 from any one or more of the battery pack 20, the motor-generator 36 or an external power supply via power inlet 22. In this embodiment, the engine 34 and motor-generator 36 are not coupled to the pump 124 for the provision of mechanical power thereto, and there is no need for clutch 40. There is no requirement for the motor-generator 36 to operate in motor mode. As such, the motor-generator 36 may be replaced by an alternator or other generator that does not necessarily support a motor mode.

Advantageously, the power system of FIG. 3 is configurable so that, in a preferred mode of operation, the electrical and hydraulic loads of the apparatus 10 are powered solely by the battery pack 20. More particularly, the battery pack 20 is used to provide electrical power to the hydraulic pump 124, as well as supplying electrical power to the electrical loads as described above. Advantageously, the engine 34 may be turned off. During periods in which there is a relatively high power demand and/or when the battery pack 20 has a relatively low charge, the engine 34 is used to drive the motor-generator 36 in generator mode, as described above, with the generated electrical power being used to power the electrical load(s). If the battery pack 20 fails, then the electrical supply may be provided by the motor-generator 36. As described above, in preferred embodiments, the main controller 28 receives electrical power from the battery pack 20 and motor-generator 36, as applicable, and uses the received electrical power to supply electrical power to the electrical load(s). The preferred power system is advantageous in that it allows the apparatus 10 to use an engine 34 with a relatively small capacity (and which produces relatively low emissions) and/or to limit the use of the engine 34 in order to reduce emissions.

Alternatively, the power system of FIG. 3 is configurable so that, in the preferred mode of operation, the engine 34 drives the motor-generator 36 in generator mode, as described above. The electrical power produced by the motor-generator 36 is used to supply the electrical load(s) (via the main controller 28 in the illustrated embodiment). Electrical power from the battery pack 20 may be used to supplement the electrical power provided by the motor-generator 36 if required. Advantageously, to support this configuration, the apparatus 10 may use not only a relatively small capacity engine 34, but also a relatively small capacity battery pack 20 in comparison to embodiments in which the power system supports battery-only power supply.

In the embodiment of FIG. 3, the wheels/tracks 18 are assumed to be electrically powered (e.g. by one or more electric motors (not shown) and as such form part of the electrical load rather than the hydraulic load. The track controller 132 may take any suitable conventional form, for example comprising a variable frequency drive. Alternatively, the wheels/tracks 18 may be hydraulically powered as described previously.

Figure 4:
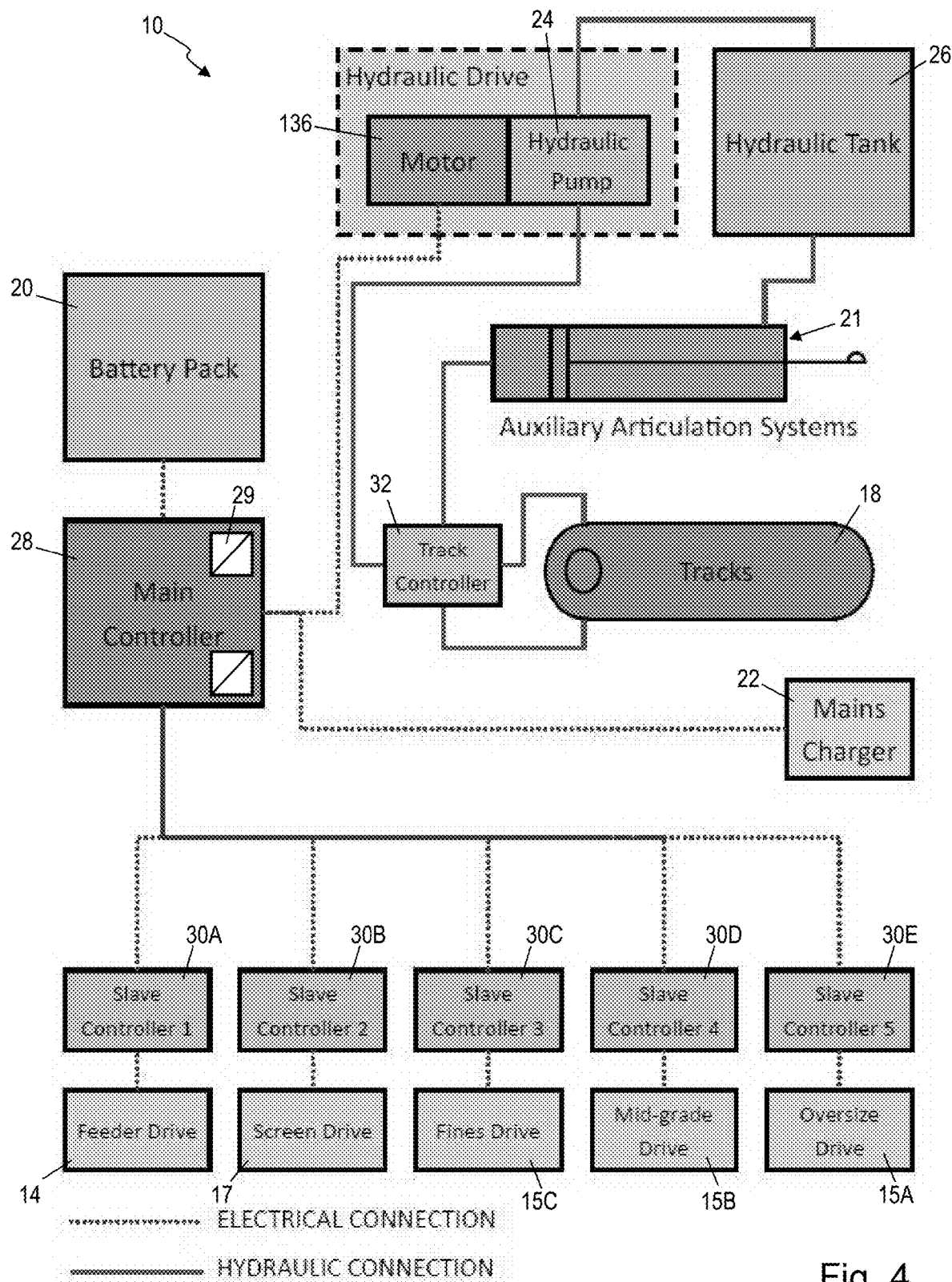
FIG. 4 is a block diagram of a third power system embodying the invention, the power system being shown with powered components of the material processing apparatus of FIG. 1.

Referring now to FIG. 4, there is shown an embodiment of the material processing apparatus 10 having an alternative power system configuration. The apparatus 10 and power system shown in FIG. 4 are similar to those of FIG. 2, with like numerals denoting like parts and the same description applying as would be apparent to a skilled person. In the embodiment of FIG. 3, the engine 34 and motor-generator 36 are omitted. The pump 24 is mechanically powered by an electrically powered motor 136. In a preferred mode of operation, the electrical and hydraulic loads of the apparatus 10 are powered solely by the battery pack 20. More particularly, the battery pack 20 is used to provide electrical power to the motor 136 which in turn provides mechanical power to the pump 24, as well as supplying electrical power to the electrical loads as described above.

Figure 5:
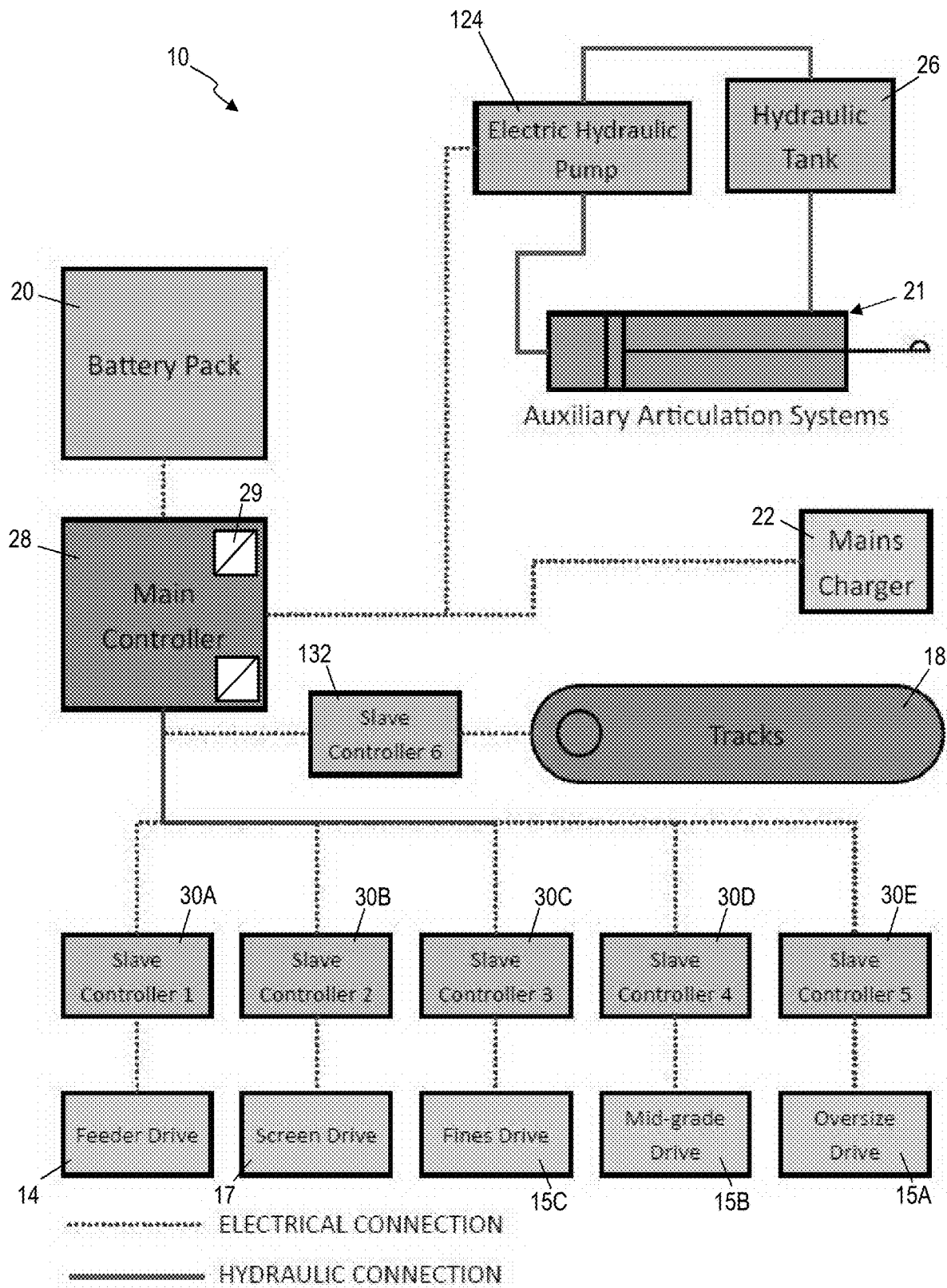
FIG. 5 is a block diagram of a fourth power system embodying the invention, the power system being shown with powered components of the material processing apparatus of FIG. 1.

FIG. 5 shows a further alternative configuration of the power system that is similar to the embodiment of FIG. 4 except that the hydraulic pump 124 is electrically powered and so the motor 136 is not required. As for the embodiment of FIG. 3, the tracks/wheels 18 are assumed to be electrically powered, but may alternatively be hydraulically powered as in the embodiments of FIGS. 2 and 4.

Figure 6:
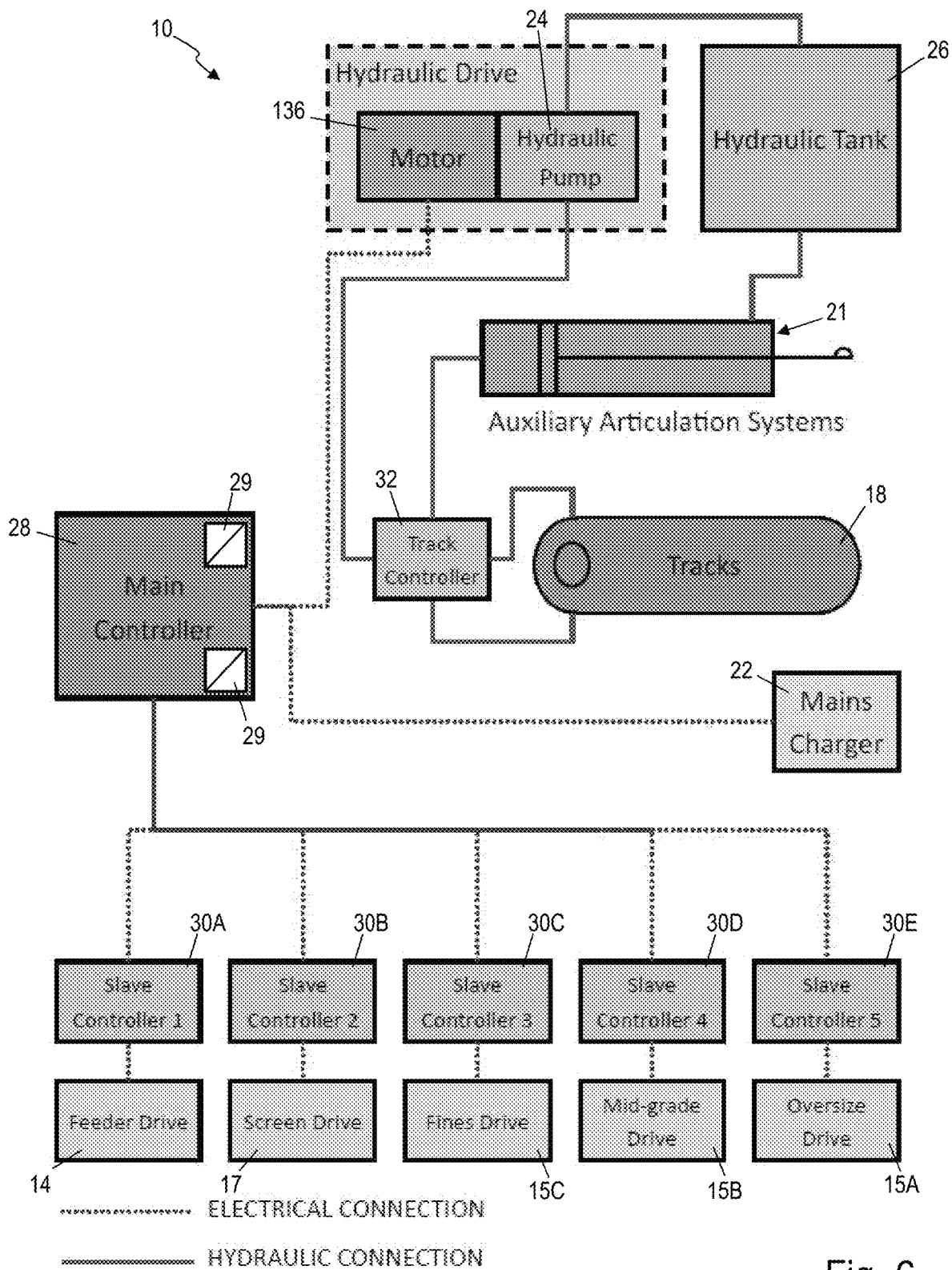
FIG. 6 is a block diagram of a fifth power system embodying the invention, the power system being shown with powered components of the material processing apparatus of FIG. 1.
Figure 7:
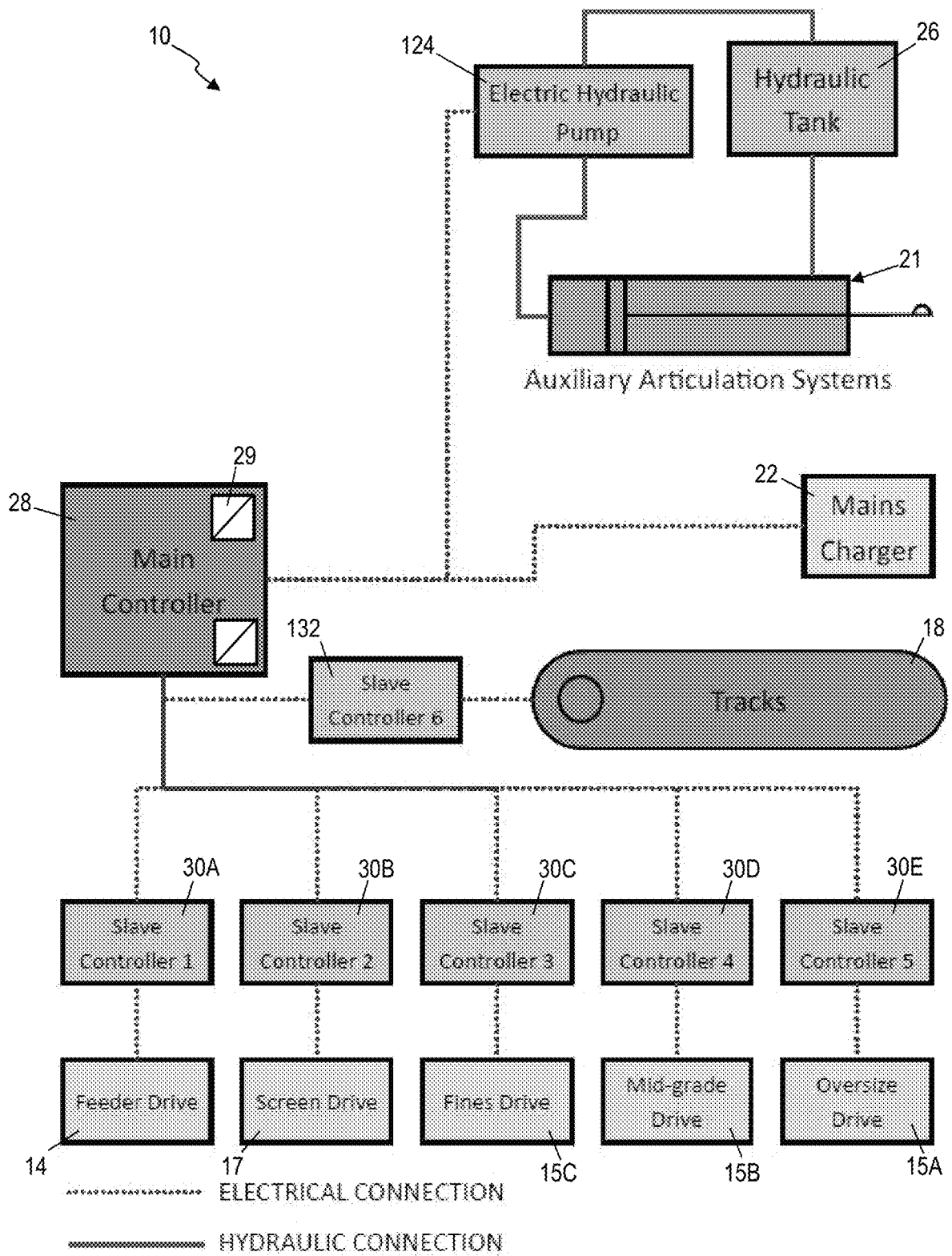
FIG. 7 is a block diagram of a sixth power system embodying the invention, the power system being shown with powered components of the material processing apparatus of FIG. 1.

In any embodiments with rechargeable batteries, the battery pack 20 can be recharged using an external power supply via electrical power inlet 22, typically when the apparatus 10 is not otherwise in use. The external power supply may also be used, via power inlet 22, to power the apparatus 10 as well as, or instead of, the battery pack 20. FIGS. 6 and 7 illustrate embodiments in which the battery pack 20 and engine 34 are omitted and the external power supply (not shown) provides the only source of power for the apparatus 10 via inlet 22. Electrical power is provided to the main controller 28 from the inlet 28, and the main controller 28 uses the received power to supply electrical power to the electrical and hydraulic loads. In the embodiment of FIG. 6, the pump 24 is mechanically powered by electric motor 136 which in turn is electrically powered by the main controller 28. In the embodiment of FIG. 7, the pump 124 is electrically powered directly by the main controller 28.

In alternative embodiments, the hydraulic and electric loads may consist of other components than illustrated herein depending on the nature of the material processing apparatus 10. Components that are disclosed herein as being electrically powered, may be hydraulically powered in alternative embodiments, and vice versa. In the illustrated embodiments the material processing unit 12 is an electrically driven screen. In alternative embodiments, the material processing apparatus may be hydraulically driven, or may be driven mechanically by the engine 34.

The invention is not limited to use with material processing apparatus and may be used with other machines, especially those with an internal combustion engine for driving one or more mechanically powered device, and/or machines in which the mechanically powered device(s) are used when the machine is stationary. Examples of other such machines include construction, mining, excavating, lifting, drilling and loading machines, e.g. an excavator or crane.

The invention is not limited to the embodiment(s) described herein but can be amended or modified without departing from the scope of the present invention.

The invention claimed is:
1. A material processing apparatus comprising a power supply system, the power supply system comprising:
    an internal combustion engine;
    an electrical system comprising an electrical power supply configured to supply electrical power to at least one electrically powered component;
    a hydraulic system comprising a hydraulic power supply configured to supply hydraulic power at least one hydraulically powered component;
    at least one controller for controlling the operation of said power supply system, wherein said electrical power supply comprises at least one battery and an electrical generator, and wherein said internal combustion engine is mechanically coupled to said electrical generator in order to drive said electrical generator,
    and wherein said at least one controller is configured to operate said power supply system in any one of at least two power supply modes in which said at least one battery and/or said electrical generator supply electrical power to said at least one electrically powered component,
    and wherein said electrical generator is a motor-generator, and said hydraulic power supply comprises a mechanically powered pump, said motor-generator being mechanically coupled to said pump to enable transmission of mechanical power from said motor-generator to said pump,
    and wherein said at least one controller is configured to operate said power supply system in at least one mode in which said motor-generator operates as a motor and in which mechanical power is transmitted from said motor-generator to said mechanically powered pump, and in which said motor-generator receives electrical power from said electrical system, and in which the internal combustion engine is switched off.

2. The apparatus of claim 1, including at least one material processing unit, optionally comprising a screening apparatus, that is operable in a working state only by one or more of said electrically powered components, and wherein, in said working state said hydraulic system is turned off.

3. The apparatus of claim 1, including at least one material processing unit that is operable in a working state only by one or more of said electrically powered components, and wherein in said working state, said internal combustion engine is turned off.

4. The apparatus of claim 1, wherein said motor-generator is mechanically coupled to said pump by a clutch that is operable to selectively transmit or not transmit mechanical power to said pump.

5. The apparatus of claim 1, wherein said motor-generator receives electrical power from said at least one battery or from an external electrical power supply.

6. The apparatus of claim 1, wherein said at least one controller is configured to operate said power supply system in at least one mode in which mechanical power produced by said internal combustion engine is transmitted to said pump via said motor-generator.

7. The apparatus of claim 6, wherein said motor-generator is configured to operate as a generator and to supply electrical power to said electrical system, or wherein said motor-generator is configured to operate as a motor and receives electrical power from said electrical system.

8. The apparatus of claim 1, wherein said power supply system is operable in at least one mode in which only said at least one battery supplies electrical power to said at least one electrically powered component.

9. The apparatus of claim 8, wherein said at least one battery supplies electrical power to operate said motor-generator as a motor.

10. The apparatus of claim 8, wherein said at least one controller causes said power supply system to supply said electrical power from said generator, as well as or instead of said from said at least one battery depending on the level of electrical power available from said at least one battery, and/or on the level of load requiring electrical power.

11. The apparatus of claim 1, wherein said power supply system is operable in at least one mode in which said generator supplies electrical power to said at least one electrically powered component.

12. The apparatus of claim 11, wherein said at least one controller causes said power supply system to supply said electrical power from said at least one battery, as well as from said generator depending on the level of load requiring electrical power.

13. The apparatus of claim 7, wherein, when acting as a motor, said motor-generator is configured to produce mechanical power supplementing the mechanical power produced by the engine and transmitted to the pump.

14. The apparatus of claim 8, wherein in said at least one mode in which only said at least one battery supplies electrical power to said at least one electrically powered component, said internal combustion engine is off, and/or said motor-generator is disengaged from said pump by said clutch.

15. The material processing apparatus of claim 1, wherein said at least one electrically powered component comprises any one or more of: a screen drive; a feeder drive; one or more conveyor drives, wherein the or each drive may comprise one or more electric motor; and/or wherein said at least one hydraulically powered component comprises any one or more of an articulation system comprising at least one hydraulic actuator and/or hydraulic motor; and/or wheel or track drive means comprising one or more hydraulic motor.

16. The apparatus of claim 1, wherein said power supply system includes an electrical inlet for receiving electrical power from an external power supply and wherein said power supply system is operable in at least one mode in which electrical power is supplied to said at least one electrically powered component from said external power supply.

17. The apparatus of claim 16, wherein in said at least one mode in which electrical power is supplied to said at least one electrically powered component from said external power supply, said internal combustion engine is off, and/or said motor-generator is disengaged from said pump by said clutch.

18. A power supply system comprising:
an internal combustion engine;
an electrical system comprising an electrical power supply configured to supply electrical power to at least one electrically powered component;
a hydraulic system comprising a hydraulic power supply configured to supply hydraulic power at least one hydraulically powered component;
at least one controller for controlling the operation of said power supply system,
wherein said electrical power supply comprises at least one battery and an electrical generator, and wherein said internal combustion engine is mechanically coupled to said electrical generator in order to drive said electrical generator,
and wherein said at least one controller is configured to operate said power supply system in any one of at least two power supply modes in which said at least one battery and/or said electrical generator supply electrical power to said at least one electrically powered component,
and wherein said electrical generator is a motor-generator, and said hydraulic power supply comprises a mechanically powered pump, said motor-generator being mechanically coupled to said pump to enable transmission of mechanical power from said motor-generator to said pump,
and wherein said at least one controller is configured to operate said power supply system in at least one mode in which said motor-generator operates as a motor and in which mechanical power is transmitted from said motor-generator to said mechanically powered pump, and in which said motor-generator receives electrical power from said electrical system, and in which the internal combustion engine is switched off.

* * * * *